(12) United States Patent
Burrell et al.

(10) Patent No.: US 9,680,787 B2
(45) Date of Patent: Jun. 13, 2017

(54) ELECTRONIC MESSAGE DISTRIBUTION LISTS

(71) Applicant: Research In Motion Limited, Waterloo (CA)

(72) Inventors: Douglas James Arthur Burrell, Waterloo (CA); Robert Michael Philip Gondosch, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 174 days.

(21) Appl. No.: 13/768,168

(22) Filed: Feb. 15, 2013

(65) Prior Publication Data
US 2014/0237055 A1    Aug. 21, 2014

(51) Int. Cl.
*G06F 15/16* (2006.01)
*H04L 12/58* (2006.01)

(52) U.S. Cl.
CPC .................... *H04L 51/28* (2013.01)

(58) Field of Classification Search
CPC ....... H04L 51/28; H04L 63/126; H04L 51/22; H04L 51/14; G06Q 10/107
USPC ......................................................... 709/206
See application file for complete search history.

(56) References Cited

U.S. PATENT DOCUMENTS

| | | | |
|---|---|---|---|
| 5,864,684 A | 1/1999 | Nielson | |
| 7,945,629 B2 | 5/2011 | Kritt et al. | |
| 8,166,113 B2 * | 4/2012 | Costea | H04L 12/585 709/206 |
| 8,219,627 B2 | 7/2012 | Pang | |
| 8,316,062 B1 * | 11/2012 | Sipher et al. | 707/804 |
| 2003/0037114 A1 * | 2/2003 | Nishio et al. | 709/206 |
| 2004/0054733 A1 * | 3/2004 | Weeks | 709/206 |
| 2006/0031308 A1 | 2/2006 | Colson et al. | |
| 2008/0148276 A1 * | 6/2008 | Kerr et al. | 719/313 |

(Continued)

FOREIGN PATENT DOCUMENTS

| | | |
|---|---|---|
| EP | 1942450 A1 | 7/2008 |
| EP | 2355017 A1 | 8/2011 |

OTHER PUBLICATIONS

Chapman D B: "Majordomo: How I Manage 17 Mailing Lists Without Answering", Proceedings of the Systems Administration Conference. Lisa, XX, XX, Oct. 23, 1992 (Oct. 23, 1992), pp. 135-144, XP003003989.

(Continued)

*Primary Examiner* — Liangche A Wang
*Assistant Examiner* — Ayele Woldemariam
(74) *Attorney, Agent, or Firm* — Perry + Currier, Inc.

(57) ABSTRACT

A distribution list identifies a plurality of recipient addresses for electronic messages. Normal updates to the distribution list can be performed via update commands from an authorized address that is stored in association with the distribution list as authorized to update the distribution list. When a removal command is received from a specific recipient address, which is not authorized to update the distribution list, the specific address can be removed from the distribution list. When an addition command is received from the specific address, a new address can be added to the distribution list. Before sending an outbound electronic message, the distribution list is resolved to the current set of recipient addresses.

19 Claims, 11 Drawing Sheets

(56) References Cited

U.S. PATENT DOCUMENTS

2009/0216678 A1\* 8/2009 May et al. .................... 709/206
2012/0059886 A1\* 3/2012 Shuster ........................ 709/206

OTHER PUBLICATIONS

"Introduction", General User's Guide to Listserv, XX, XX, Dec. 16, 1996 (Dec. 16, 1996), pp. 5,7-9, 12, XP003003986.
Horst Tellioglu: "Mailing lists", Internet Citation, Dec. 3, 1998 (Dec. 3, 1998), XP002429406, Retrieved from the Internet: URL:http://timaios.philo.at/wiki stuff/mlms.pdf—[retrieved on Apr. 13, 2007].
"Distribution List Warning", ip.com Journal, ip.com Inc., West Henrietta, NY, US, Dec. 2, 2003 (Dec. 2, 2003), XP013013630, ISSN: 1533-0001.
Corresponding European Patent Application No. 13155441.2 Extended Search Report dated Aug. 23, 2013.

\* cited by examiner

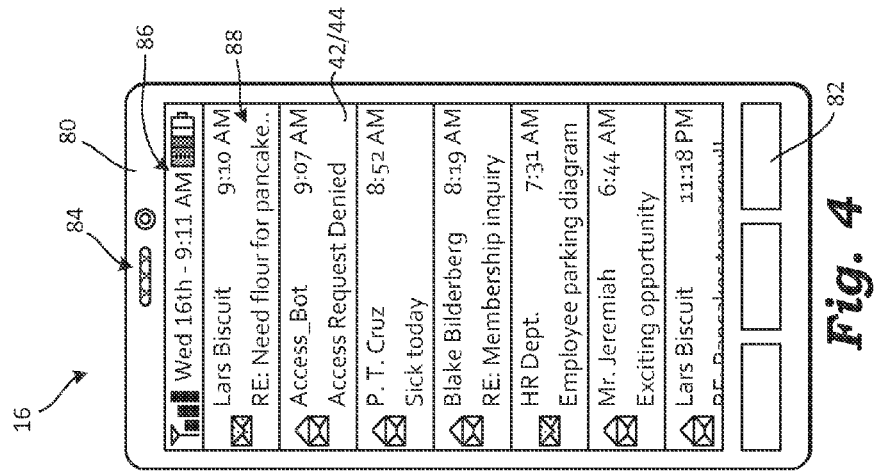
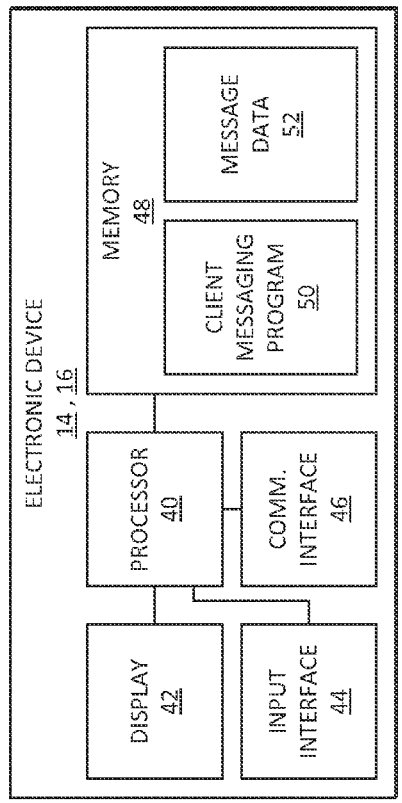
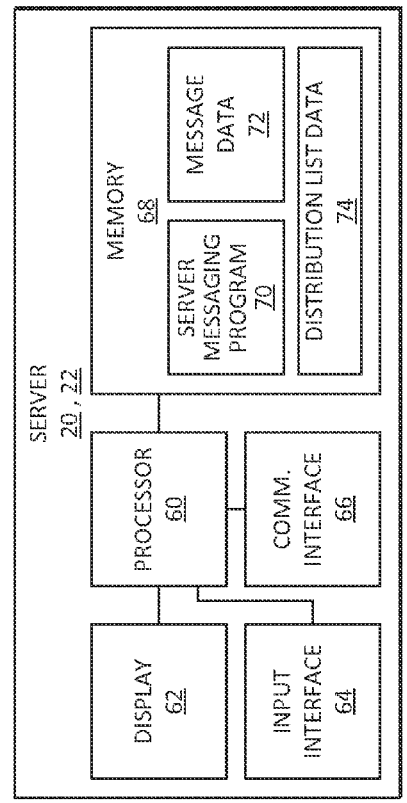
Fig. 4
Fig. 2
Fig. 3

| DISTRIBUTION LIST DATA STRUCTURE 100 | |
|---|---|
| DISTRIBUTION LIST ID 102 | 5426 |
| DISTRIBUTION LIST NAME 103 | Team 22 |
| DISTRIBUTION LIST OWNER 104 | lars@example.com |
| LIST EXPIRY TIME 105 | Feb. 26, 2013: 22:00 |
| DISTRIBUTION LIST RECIPIENT 106 | |
|     RECIPIENT ID 108 | 1 |
|     RECIPIENT ADDRESS 110 | markus@example.com |
|     RECIPIENT DISPLAY NAME 112 | Markus Grey |
| DISTRIBUTION LIST RECIPIENT 106 | |
|     RECIPIENT ID 108 | 2 |
|     RECIPIENT ADDRESS 110 | ruth@example.com |
|     RECIPIENT DISPLAY NAME 112 | Ruth Arkell |
| DISTRIBUTION LIST RECIPIENT 106 | |
|     RECIPIENT ID 108 | 3 |
|     RECIPIENT ADDRESS 110 | cranston@example.com |
|     RECIPIENT DISPLAY NAME 112 | Cranston Jones |
| ⋮ | ⋮ |
| DISTRIBUTION LIST RECIPIENT 106 | |
|     RECIPIENT ID 108 | 7 |
|     RECIPIENT ADDRESS 110 | lars@example.com |
|     RECIPIENT DISPLAY NAME 112 | Lars Biscuit |

*Fig. 5*

| ADDITION COMMAND DATA STRUCTURE 120 ||
|---|---|
| DISTRIBUTION LIST ID 122 | 5426 |
| ADD RECIPIENT 124 ||
|     RECIPIENT ADDRESS 126 | cranston@example.com |
|     REQUESTING ADDRESS 128 | ruth@example.com |

*Fig. 6*

| REMOVAL COMMAND DATA STRUCTURE 130 ||
|---|---|
| DISTRIBUTION LIST ID 132 | 5426 |
| REMOVE RECIPIENT 134 ||
|     RECIPIENT ADDRESS 136 | cranston@example.com |
|     REQUESTING ADDRESS 138 | cranston@example.com |

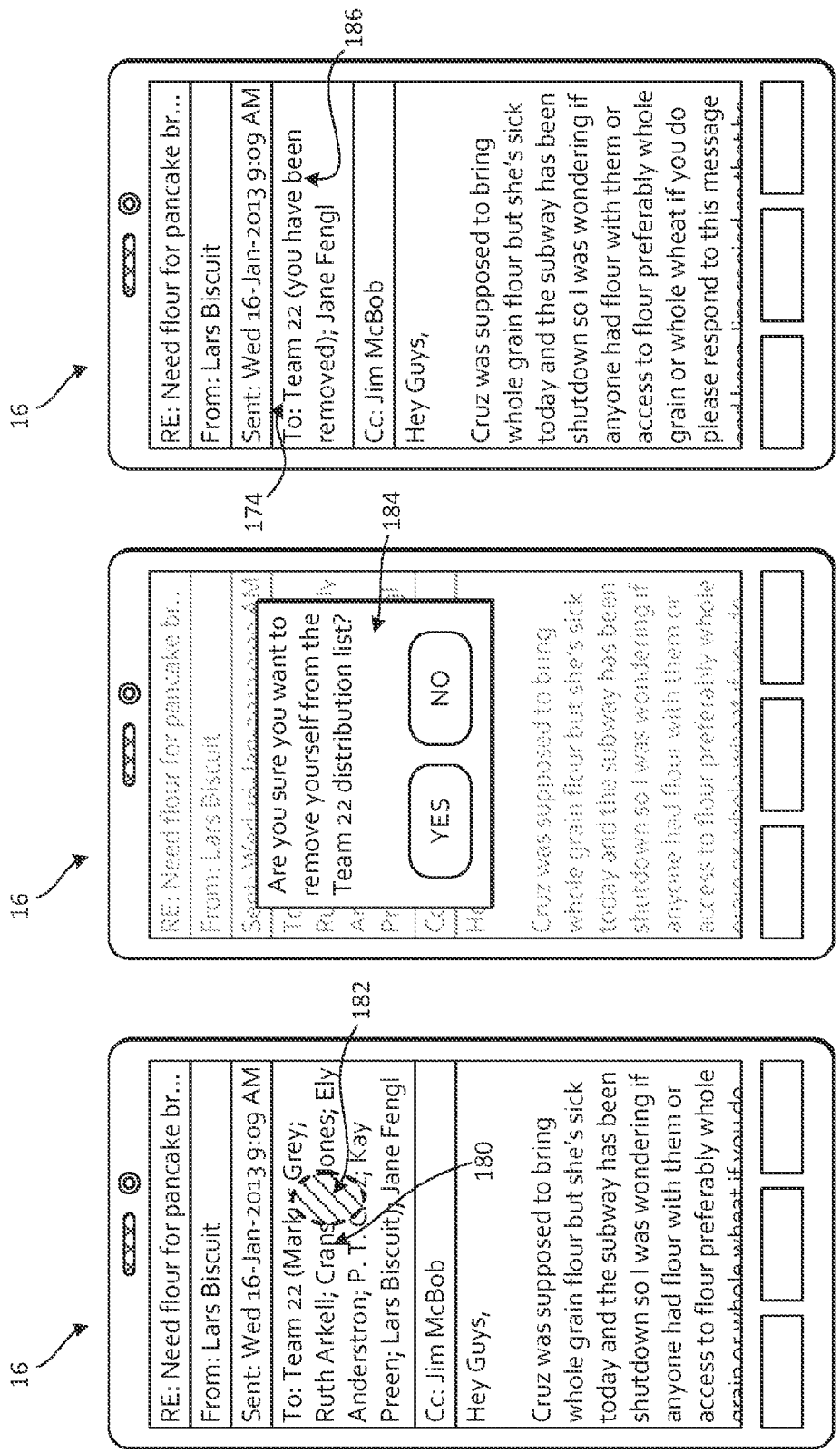

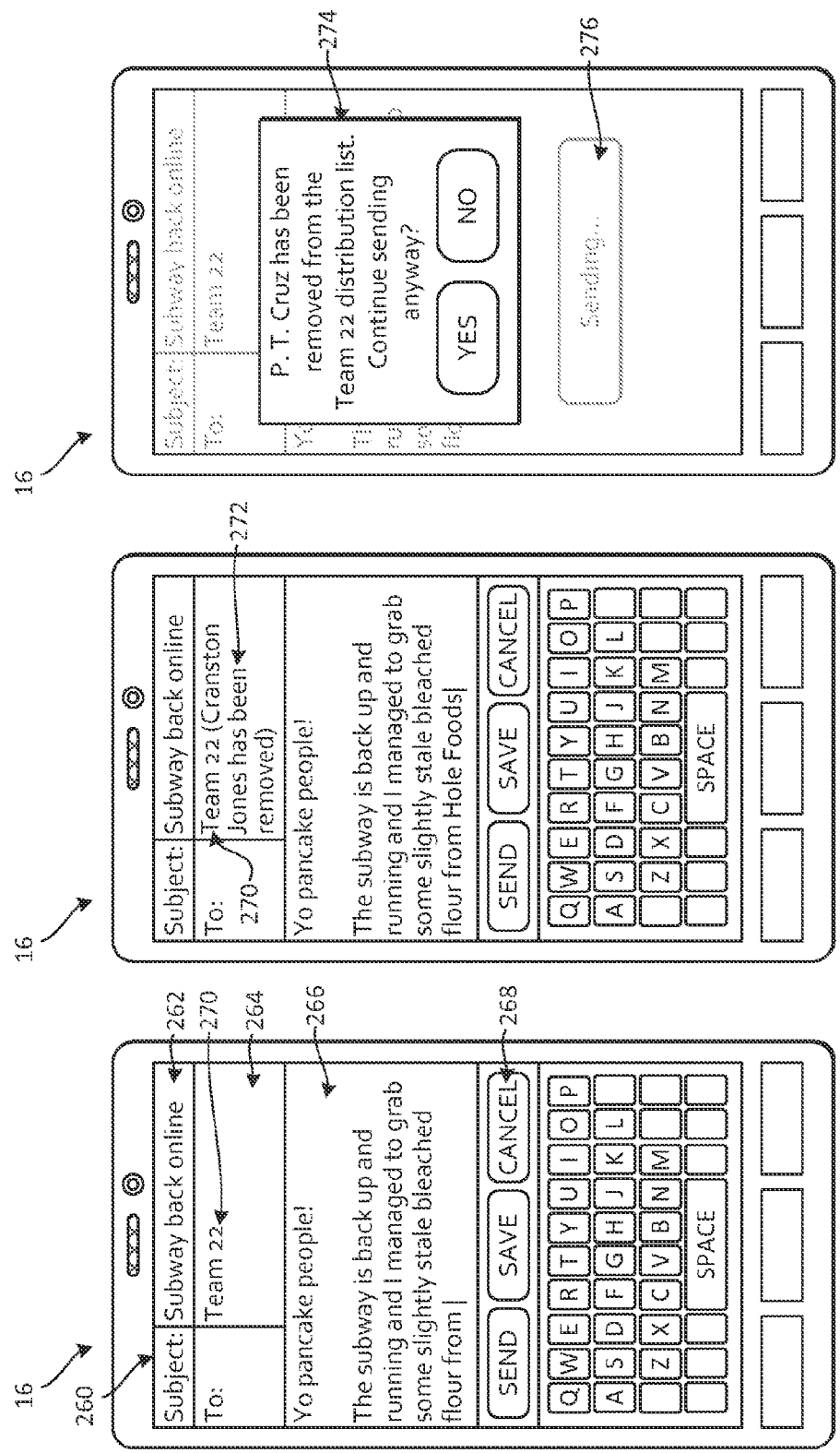

ELECTRONIC MESSAGE DISTRIBUTION LISTS

FIELD

This disclosure relates to computer systems and electronic devices and, more particularly, to communication of electronic messages among computer systems and electronic devices.

BACKGROUND

Electronic messaging systems, such as email systems, have become ubiquitous. While speed and reliability of communications have improved, there is a tendency towards over-communication. People, particularly those whose work is performed with the help of electronic messaging, may send and receive too many messages. This can lead to reduced productivity, in that a person's important messages, which may demand response, may get lost in the clutter of unimportant messages on which the person was merely copied as a matter of precaution or policy. Beyond human concerns, messages consume storage space and network resources, and important and unimportant messages alike must be stored and require network capacity to be sent and received. Network capacity is particularly an issue when messages are sent via wireless communications, as is the case with mobile electronic devices, such as mobile phones and tablet computers.

BRIEF DESCRIPTION OF THE DRAWINGS

The drawings illustrate, by way of example only, embodiments of the present disclosure.

FIG. 2 is a block diagram of an electronic device.

FIG. 3 is a block diagram of a server.

FIG. 4 is a front view of a mobile electronic device showing a message list.

FIG. 5 is a schematic diagram of a distribution list data structure.

FIG. 6 is a schematic diagram of an addition command data structure.

FIG. 7 is a schematic diagram of a removal command data structure.

FIGS. 9A-F are front views of the mobile electronic device showing removal of a recipient from a distribution list.

FIGS. 11A-C are front views of mobile electronic devices showing addition of a new and approved recipient to a distribution list.

FIGS. 13A-C are front views of the mobile electronic device showing indications of updates to a distribution list during message composition and sending.

DETAILED DESCRIPTION

Normal updates to a distribution list of message recipients can be performed by an authorized address that is authorized to update the distribution list. As will be discussed in greater detail herein, a removal command from a specific recipient address, which is not authorized to update the distribution list, causes the specific recipient address to be removed from the distribution list. Further, an addition command from the specific recipient address causes a new recipient address to be added to the distribution list. Subsequently, before an outbound electronic message is sent to the distribution list, the distribution list is resolved to the current set of recipient addresses. Because the distribution list allows recipient self-removal and new recipient additions from unauthorized addresses, the distribution list can be considered dynamic.

Figure 1:
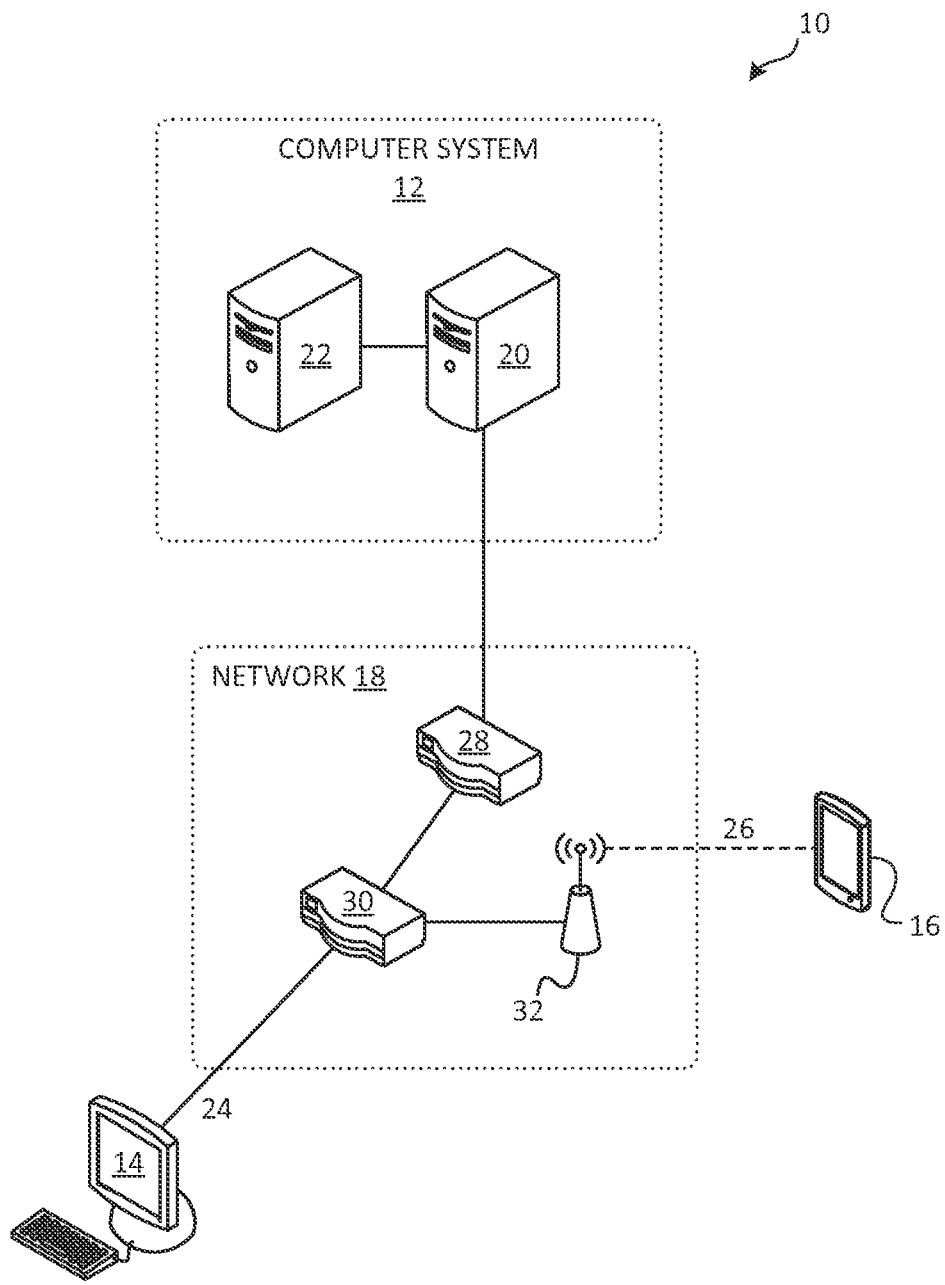
FIG. 1 is a diagram of a system according to an embodiment of the present disclosure.

FIG. 1 shows a system 10 according to an embodiment of the present disclosure. The system 10 includes a computer system 12, a plurality of electronic devices 14, 16, and a network 18 that connects the plurality of electronic devices 14, 16 to each other and to the computer system 12. The electronic devices 14, 16 are remote to the computer system 12.

The computer system 12 can include one or more servers 20, 22. The servers 20, 22 can be computers or other specialized devices for processing messages sent among the plurality of electronic devices 14, 16. Each of the servers 20, 22 may be configured for a specific purpose within the computer system 12. Alternatively or additionally, servers 20, 22 may be configured for redundancy. For example, one of the servers 20, 22 may be configured to send and receive messages, such as email messages, among the electronic devices 14, 16, while another of the servers 20, 22 may be configured to store messaging account information, such as messaging addresses, identities, and credentials, as well as other messaging resources such as distribution lists of addresses.

The plurality of electronic devices 14, 16 can include devices such as desktop computers, laptop computers, tablet computers, mobile phones, smart phones, and the like. Some of the electronic devices 14 may be configured to be used in a stationary setting, while others of the electronic devices 16 may be mobile or portable. Accordingly, each of the plurality of electronic devices 14, 16 can be connected to the network 18 via one or more of a wired link 24 and a wireless link 26.

The network 18 can include network devices 28, 30, 32 such as routers, switches, servers, firewalls, wireless access points, cellular telephone base stations and towers, and the like. The network may include one or more of a local-area network, a wide-area network, an Internet service provider's network, a cellular telephone network, an intranet, and the Internet.

FIG. 2 shows an example of an electronic device 14, 16. The electronic device 14, 16 can include one or more processors 40, a display 42, an input interface 44, a communications interface 46, and memory 48. The display 42, input interface 44, communications interface 46, and memory 48 may be coupled to the processor 40 and to each other via a data bus or other data connection.

The processor 40 is configured to execute instructions originating from the memory 48 or the communications interface 46 to perform methods or processes described herein. The processor 40 can include one or more processing cores. Multiple interconnected processors can be provided as the processor 40.

The display 42 is a device capable of displaying visual output generated by the processor 40. The display 42 can include one or more devices such as a liquid crystal display (LCD), a light-emitting diode (LED) display, and the like.

The input interface 44 can include one or more devices such as a touch-sensitive element that is physically part of the display 42, a keypad or keyboard having physical keys, a trackpad or touchpad responsive to finger movement, a mouse, buttons, a microphone, and the like.

The communications interface 46 can include one or more communications adaptors suitable for the type of link or links 24, 26 (FIG. 1) used by the electronic device 14, 16 in communicating with the network 18 or in communicating directly with other electronic devices 14, 16. Such adaptors can include wired network adaptors (e.g., Ethernet) and wireless network adaptors (e.g., WiFi, 3G, LTE, Bluetooth, etc).

The memory 48 stores programs and data for use by the processor 40. The memory 48 can include volatile and non-volatile memory devices such as RAM, flash memory, ROM, hard drives, and the like.

The memory 48 stores a client messaging program 50 that allows the electronic device 14, 16 to communicate electronic messages, such as email messages, with other electronic devices 14, 16. The client messaging program 50 includes instructions and data that configure the processor 40 to generate the interfaces, respond to input, and perform the methods and processes, as discussed herein.

The memory 48 further stores message data 52 for one or more user addresses, such as an email address, associated with one or more electronic messaging accounts accessible at the electronic device 14, 16. Message data 52 can further store an encryption key and other data associated with the electronic messaging account. Message data 52 can further store message content, message statuses (e.g., read, unread), and message relationships for message threads.

FIG. 3 shows an example of a server 20, 22. The server 20, 22 can include one or more processors 60, a display 62, an input interface 64, a communications interface 66, and memory 68. The display 62, input interface 64, communications interface 66, and memory 68 may be coupled to the processor 60 and to each other via a data bus or other data connection.

The processor 60 is configured to execute instructions originating from the memory 68 or the communications interface 66 to perform methods or processes described herein. The processor 60 can include one or more processing cores. Multiple interconnected processors can be provided as the processor 60.

The display 62 is a device capable of displaying visual output generated by the processor 60. The display 62 can include one or more devices such as an LCD, an LED display, and the like.

The input interface 64 can include one or more devices such as a touch-sensitive element that is physically part of the display 62, a keypad or keyboard having physical keys, a trackpad or touchpad responsive to finger movement, a mouse, buttons, a microphone, and the like.

The communications interface 66 can include one or more communications adaptors suitable for communicating with the network 18 or with other servers 20, 22. Such adaptors can include wired network adaptors and wireless network adaptors.

The memory 68 stores programs and data for use by the processor 60. The memory 68 can include volatile and non-volatile memory devices such as RAM, flash memory, ROM, hard drives, and the like.

The memory 68 stores a server messaging program 70 that allows communication of electronic messages among the electronic devices 14, 16. The server messaging program 70 includes instructions and data that configure the processor 60 to send electronic messages and to perform the methods and processes discussed herein.

The memory 68 further stores message data 72 for the user addresses associated with the electronic messaging accounts accessible at the electronic device 14, 16. Message data 72 can further include encryption keys, login credentials, and other data associated with the electronic messaging accounts. Message data 72 can further store message content, message statuses (e.g., read, unread), and message relationships for message threads.

The memory 68 also stores distribution list data 74 that defines one or more distributions lists of recipient messaging accounts. In the example of email, a distribution list includes a list of email addresses. When a message is sent to a distribution list, the server messaging program 70 references the distribution list data 74 to resolve an identifier of the distribution list contained in the message into the recipient addresses, and then sends the messages to the recipient addresses. The sent message also includes the identifier of the distribution list, so that each recipient knows that the message was sent to the distribution list. The distribution list data 74 may be stored according to the data structure shown in FIG. 5.

As shown in FIG. 4, the electronic device 16 can be a mobile or portable electronic device, and may be known as a mobile phone, smart phone, tablet computer, or the like.

In this embodiment, the electronic device 16 includes a housing 80 configured to hold the operational components of the electronic device 16. The electronic device 16 can further include physical buttons 82, which may form part of the input interface 44, and other components 84, such as a speaker, microphone, camera, and the like.

In this embodiment, the display 42 is a touch-screen, so the input interface 44 includes touch-sensitive elements of the display 42. The electronic device 16 may also include a physical keyboard, such as a full keyboard (e.g., QWERTY keyboard), that also forms part of the input interface 44.

The electronic device 16 is configured to display a status area 86 at the display 42. The status area 86 may show information relevant to the overall operation of the electronic device 16, such as network signal strength, date/time, battery charge level, and the like.

The electronic device 16 is further configured to display various user interfaces for messaging on the display 42, such as a message list 88. The message list 88 is configured to display user-interface elements for messages or message threads, and may be configured to be sorted in reverse-chronological order, in chronological order, by subject, by sender, and in other ways. The input interface 44 is configured to receive selection of a message or message thread in the message list 88 and, in response, cause the message or message thread to be opened and shown in a message viewing interface. The input interface 44 is further configured to receive other commands, such as a command to compose a new message, delete a message or message thread, and the like. A message composition interface allows messages to be addressed to distribution lists of message recipients.

FIG. 5 shows a distribution list data structure 100 for storing the distribution list data 74 at the server 20, 22. The distribution list data structure 100 and the data contained therein can be implemented by a class, type, array structure, markup language file (e.g., XML), database, or similar to store one or more distribution lists of recipients of messages.

The distribution list data structure 100 includes data elements such as a distribution list identifier 102, a distribution list name 103, a distribution list owner 104, an expiry time 105, and distribution list recipients 106.

The distribution list identifier 102 stores a unique identifier, such as a number, hash value, or similar, of the distribution list. The distribution list identifier 102 can be generated when the distribution list is created, and can be referenced for communications using the distribution list and for updates to the distribution list.

The distribution list name 103 stores a text string of the name of the distribution list. Such a string may be more intelligible to human readers than the distribution list identifier 102.

The distribution list owner 104 stores an address, such as an email address or other identifier, of an account that is authorized to update the distribution list. Such an address can belong to the user who created the distribution list, or can belong to a user who was transferred responsibility of the distribution list. Any of the one or more addresses listed as a distribution list owner 104 are authorized to make changes to the distribution list.

The distribution list expiry time 105 stores a date and time at which the distribution list expires and is deleted. If the expiry time 105 is not entered, the distribution list does not expire.

The distribution list recipients 106 form the actual distribution list. Each of the one or more distribution list recipient data elements 106 stores information about the recipient. In this embodiment, such data includes a unique identifier 108 for the recipient, a recipient address 110, and a recipient display name 112.

The recipient identifier 108 stores a unique identifier, such as a number, hash value, or similar, of the recipient. The recipient identifier 108 is unique within the distribution list data structure 100. The recipient identifier 108 can be generated when the recipient is added to the distribution list, and can be referenced for communications using the distribution list and for updates to the distribution list.

The recipient address 110 stores an address, such as an email address or other identifier, of an account at which the recipient receives messages.

The recipient display name 112 stores a text string of the name of the recipient. Such a string may be more intelligible to human readers than the recipient address 110.

The server 20, 22 is configured to store and maintain distribution lists according to the data structure 100. As part of maintenance, the server 20, 22 can be further configured to periodically check distribution list expiry times 105 against a clock and then delete any distribution list that has an expiry time that is earlier than or equal to the current time.

Regarding distribution list creation, the server 20, 22 or an electronic device 14, 16 connected to the server 20, 22 can provide a user interface configured to receive data according to the distribution list data structure 100. Such a user interface can include a Web page, client program, or the like and can allow data entry substantially as shown by the example data in FIG. 5.

The server 20, 22 is also configured to permit normal updates to the distribution list by a user at an authorized address listed as a distribution list owner 104. Such updates may be made by update commands configured to add and remove recipients to the distribution list, rename the distribution list, delete the distribution list, and similar. The same user interface used for creation of distribution lists can be used for normal updates.

FIG. 6 shows a data structure 120 for an addition command that adds a recipient to a distribution list represented using the distribution list data structure 100. The addition command data structure 120 includes data elements for a distribution list identifier 122 and a recipient to add 124. The distribution list identifier 122 identifies the distribution list to which the new recipient is to be added, and thus takes the same form.

The data element for the recipient to add 124 includes a recipient address 126 and a requesting address 128. The recipient address 126 stores an address, such as an email address or other identifier, of an account belonging to the recipient to be added. The requesting address 128 stores an address, such as an email address or other identifier, of an account from which the addition command was sent. The requesting address 128 can be used to determine whether the requesting user is authorized to add recipients to the distribution list by, for example, comparing the requesting address 128 to the distribution list owner 104 (FIG. 5).

FIG. 7 shows a data structure 130 for a removal command that removes a recipient from a distribution list represented using the distribution list data structure 100. The removal command data structure 130 includes data elements for a distribution list identifier 132 and a recipient to remove 134. The distribution list identifier 132 identifies the distribution list from which the recipient is to be removed, and thus takes the same form.

The data element for the recipient to remove 134 includes a recipient address 136 and a requesting address 138. The recipient address 136 stores an address, such as an email address or other identifier, and uniquely identifies the recipient to be removed. The requesting address 138 stores an address, such as an email address or other identifier, of an account from which the removal command was sent. The requesting address 138 can be used to determine whether the requesting user is authorized to remove recipients from the distribution list by, for example, comparing the requesting address 138 to the distribution list owner 104 (FIG. 5).

Figure 8:
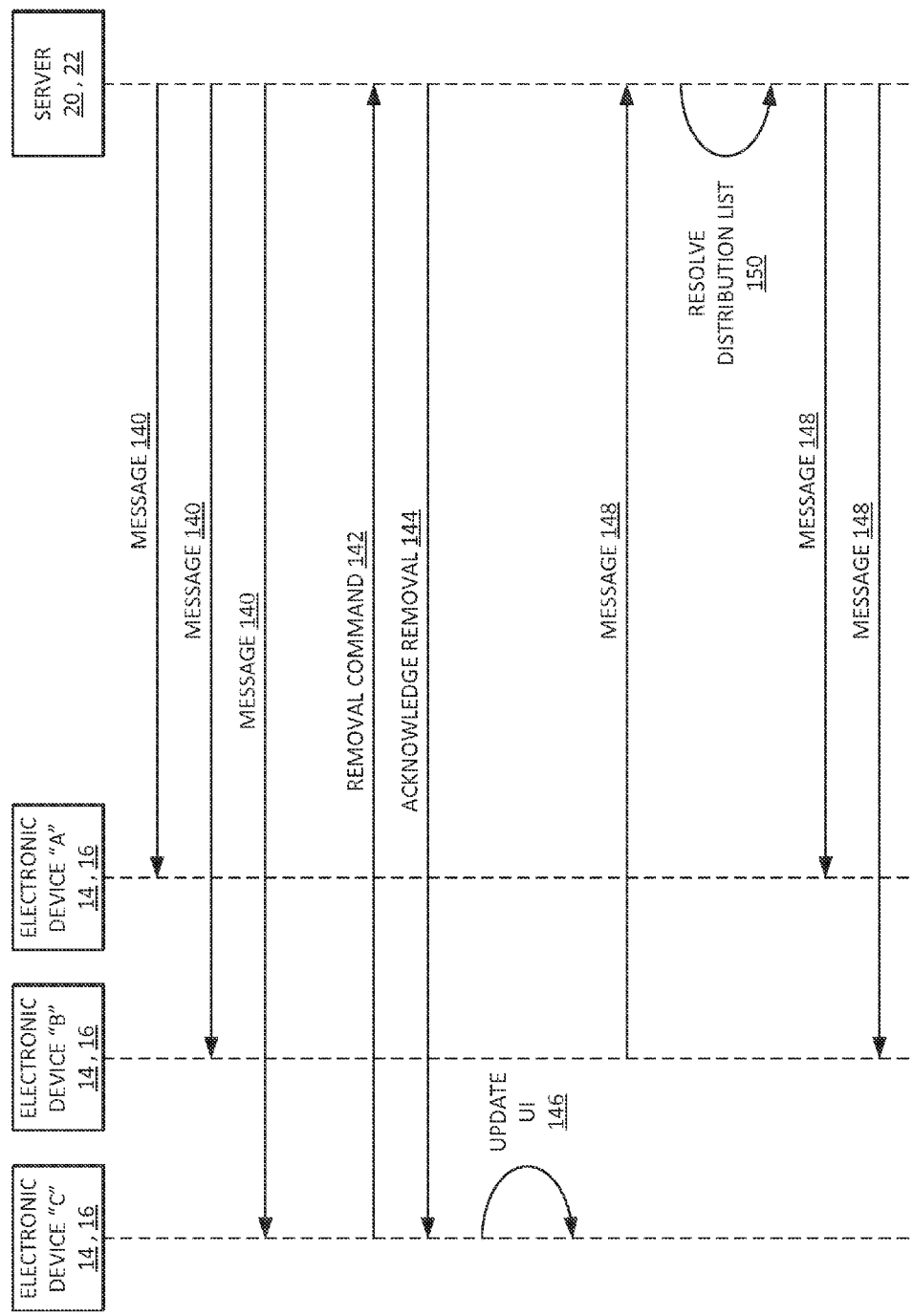
FIG. 8 is a diagram of a process for removing a recipient from a distribution list.

FIG. 8 illustrates an example of a process for removing a recipient from a distribution list, such as a distribution list defined by distribution list data 74 (FIG. 4) stored according to the data structure 100 (FIG. 5).

A message 140, such as an email message, originating from an electronic device 14, 16 is sent from a server 20, 22 to a plurality of recipient electronic devices 14, 16 via a distribution list that identifies messaging accounts accessible by the recipient electronic devices 14, 16. For convenience, in the examples, recipient electronic devices 14, 16 are differentiated in the figures by designations "A", "B", and "C".

The message 140 includes an indication that the message 140 was sent to a distribution list. Such an indication can be the unique distribution list identifier 102 (FIG. 2) and may further include the distribution list name 103. The message 140 may include a full copy of the distribution list, so that the electronic devices 14, 16 can determine the other recipients of the message. In other embodiments, a full copy of the distribution list is only sent to an electronic device 14, 16 that specifically requests such from the server 20, 22.

Should a user of one of the recipient electronic devices 14, 16 reply to the message 140, then such a reply message would be sent to the distribution list, as indicated by the distribution list identifier 102. However, when not all users need to be included in the communication, such replies may waste network resources by sending needless messages and may bother users by flooding message lists with correspondence that they have no intention of reading.

A user of one of the electronic devices 14, 16 may therefore decide to remove his/her specific address from the distribution list by issuing a removal command 142 in the form of the removal command data structure 130. This can be done without the specific address having to be authorized to update the distribution list. Accordingly, the client messaging program 50 of the requesting electronic device 14, 16 (e.g., device "C") provides the data required by the removal command data structure 130 (e.g., distribution list identifier 132, recipient address 136, and requesting address 138) and sends the removal command 142 to the server 20, 22 for processing.

The server 20, 22 receives the removal command 142 and processes the removal command 142 by confirming that the removal command is a remove-self request by determining that the recipient address 136 is the same as requesting address 138. If the removal command 142 is indicative of a recipient requesting removal from the distribution list, then the server 20, 22 deletes the distribution list recipient 106 (FIG. 5) corresponding to the recipient address 136 identified by the removal command 142.

The server 20, 22 may also determine whether the requesting address 138 specified in the removal command 142 is an authorized address (i.e., listed as a distribution list owner 104 in FIG. 5). If the requesting address 138 is authorized, then the removal of the recipient address 136 from the distribution list can be processed only when the recipient address 136 is not the same as requesting address 138, so as to permit the distribution list owner to update the distribution list while preventing inadvertent self-removal of the owner. Table 1 summarizes this logic.

TABLE 1

| Requesting address equal to recipient address to be removed? | Requesting address is authorized? | Action to take for recipient address to be removed |
|---|---|---|
| TRUE | FALSE | REMOVE |
| FALSE | TRUE | REMOVE |
| TRUE | TRUE | DO NOT REMOVE |
| FALSE | FALSE | DO NOT REMOVE |

The server 20, 22 then responds to the requesting electronic device 14, 16 with an acknowledgement 144 of the removal. The server 20, 22 may copy the distribution list owner 104 (FIG. 5) on the removal acknowledgement 144, so as to alert the owner to the change in the distribution list.

The requesting device 14, 16 then performs a user interface update 146 to indicate to the user that the removal request 142 was processed. This can be by providing, for example, a message or graphic to the user.

At a later time, upon receiving an outbound message 148 from one of the electronic devices 14, 16 sent as a reply to the message 140 or as a new message addressed to the distribution list, the server 20, 22 resolves 150 the identifier of the distribution list in the message 148 to the current recipient addresses. The server 20, 22 then sends the message 148 to the current recipient addresses, which notably no longer include the electronic device 14, 16 (i.e., device "C") whose specific address was removed.

FIGS. 9A-F show a user interface of the mobile electronic device 16 when receiving at a specific address a message, such as the message 140 (FIG. 8), sent to a distribution list, and subsequent removal of the specific address from the distribution list. The electronic device 16 can be configured to display information and carry out action in response to input as described below.

Figures 9A, 9B, 9C:
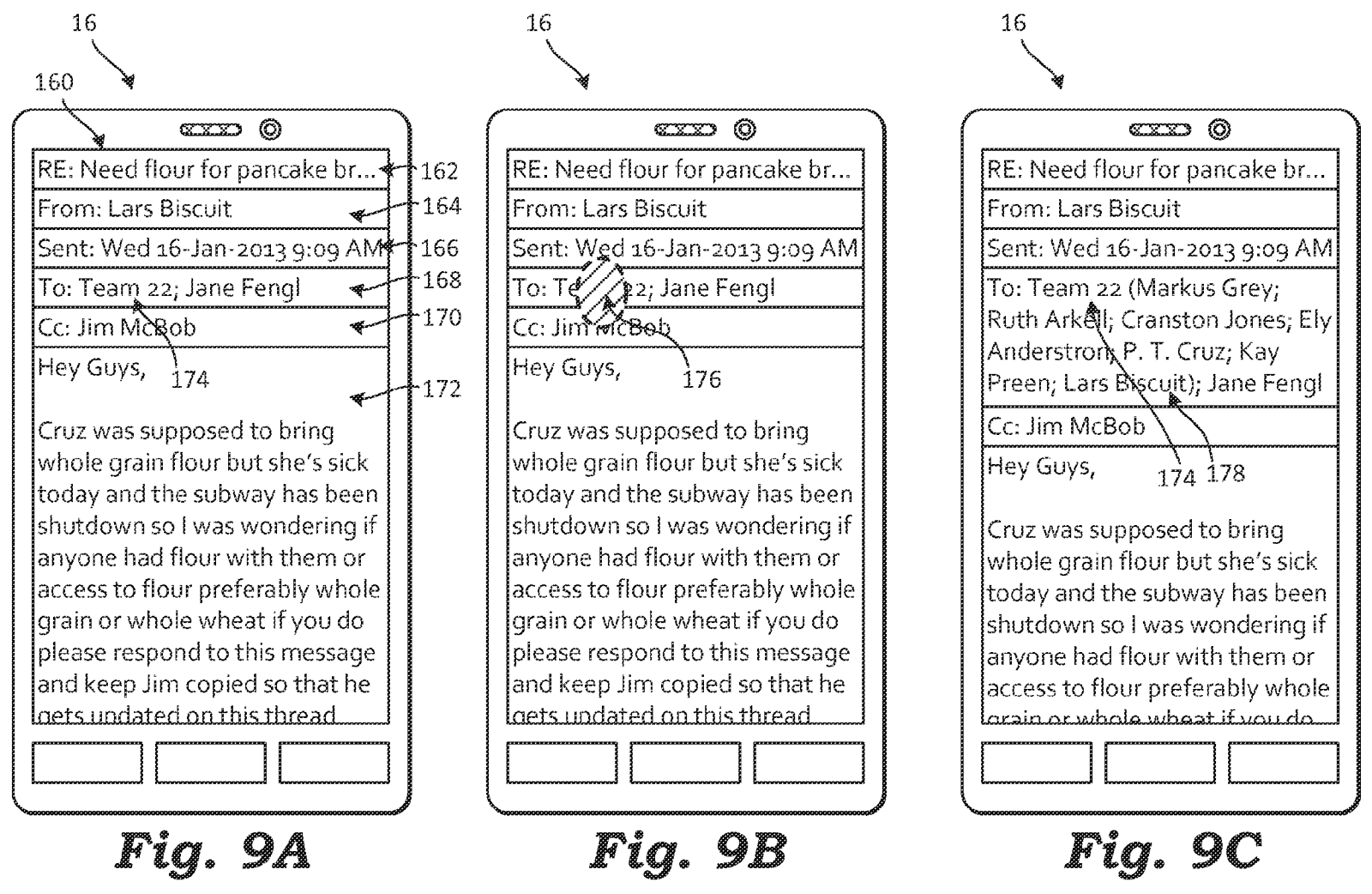

As shown in FIG. 9A, a message viewing interface 160 includes a subject field 162, a sender address field 164, a sent date-time field 166, a recipient field 168, a copy address field 170, and a message content area 172 to display corresponding underlying data of a message being read at the mobile electronic device 16.

When the message is addressed to the distribution list, the recipient field 168 can display an indication 174 of a distribution list. Such a distribution list indication 174 can include one or more of a text string and a graphic indicative of a name 103 (FIG. 5) or other identifier of the distribution list.

Referring to FIG. 9B, the message viewing interface 160 is configured to receive a first predetermined input 176 at the distribution list indication 174. The first predetermined input can include one or more of a touch, mouse click, key press, and the like.

As shown in FIG. 9C, in response to the first predetermined input 176, the distribution list indication 174 is augmented to display an indication 178 of at least several of the plurality of recipient addresses included in the distribution list. This can be accomplished by, for example, displaying one or more of a text string and a graphic indicative of the recipient display names 112 (FIG. 5). While displaying the indication 178 of recipient addresses, the distribution list indication 174 may be continued to be displayed, as shown, or may be removed from display. When the electronic device 16 does not have a local copy of the distribution list, the electronic device 16 can be configured to request such from the server 20, 22 in response to the first predetermined input 176.

FIG. 9D shows an indication 180, such as a display name, of the specific recipient address associated with the messaging account of the electronic device 16. That is, the indication 180 shows the name of the user who received the message at the device 16. The indication 180 of the specific address is configured to accept a second predetermined input 182, such as a touch, mouse click, key press, or the like.

In response to the second predetermined input 182, the electronic device 16 sends the removal command to the server 20, 22 for processing. Thus, the first and second predetermined inputs 176, 182 form a removal input that allows the user of the device 16 to select his/her name from the distribution list to generate a removal command that removes the user from the distribution list at the server 20, 22.

The display names of other members of the distribution list may be configured to be unresponsive to the second predetermined input 182 and further may be indicated as such by font color (e.g., greyed out), font style, graphic, or the like, when the specific address associated with the electronic device 16 is not authorized to update the distribution list. This advantageously prevents an unauthorized recipient from selecting someone else for removal, while still permitting the unauthorized user to remove him/herself.

However, to facilitate a simplified way of updating the distributing list by the owner of the distribution list, all of display names of other members of the distribution list may be configured to be responsive to the second predetermined input 182, when the specific address associated with the electronic device 16 is authorized to update the distribution list.

As shown in FIG. 9E, in response to second predetermined input 182 and before the electronic device 16 sends the removal command 142 to the server 20, 22, the electronic device 16 may provide a confirmation interface 184. The confirmation interface 184 notifies the user of the consequences of the removal input and provides user interface elements, such as buttons, for confirming or cancelling the removal input.

Lastly, as shown in FIG. 9F, the electronic device updates the message viewing interface to include an indication 186 that the user has successfully been removed. This can occur in response to the device 16 receiving the removal acknowledgement 144 (FIG. 8) from the server 20, 22. The removal indication 186 can include one or more of a text string or graphic. Further, in this embodiment, the indication 178 of recipient addresses is cleared from the display and the distribution list indication 174 is again shown unexpanded.

In this embodiment, it is notable that the removal input and removal command do not require approval by the distribution list owner 104. Accordingly, an unauthorized user may remove him/herself from a distribution list without requiring approval.

It should be apparent from the above that a user of the mobile device 16 can quickly and easily remove themselves from a server-stored distribution list, even when the user is not authorized to update the distribution list. That is, the user is provided with the limited privilege to modify the distribution list by virtue of their address being on the distribution list, where the limited privilege is restricted to removing their address from the distribution list. This can advantageously save network resources in that subsequent messages to the distribution list, such as replies, are not sent to the removed user because the distribution list is resolved by the server 20, 22 to the constituent addresses each time a message is sent to the distribution list.

Figure 10:
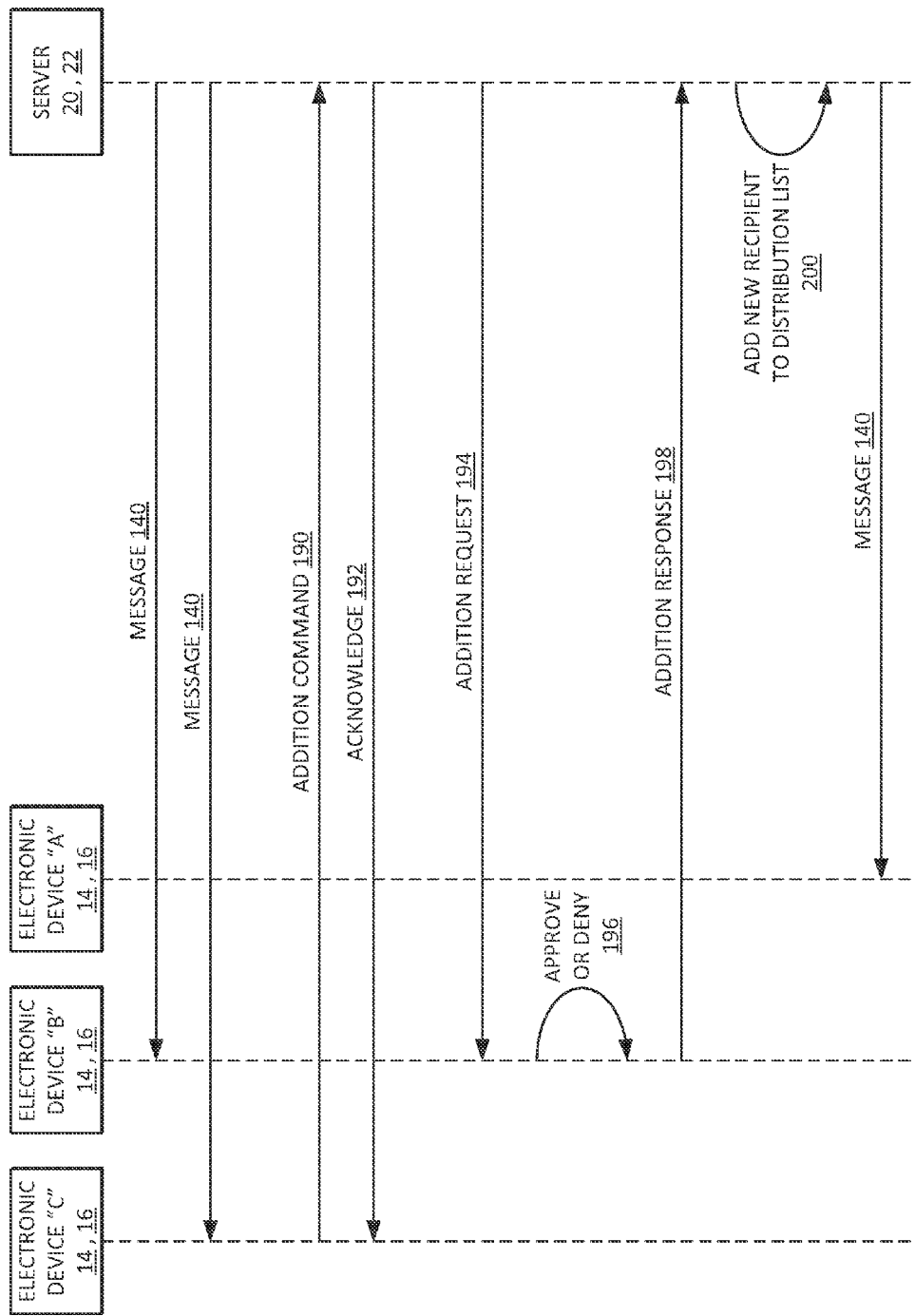
FIG. 10 is a diagram of a process of adding a new recipient to a distribution list.

FIG. 10 illustrates an example of a process for adding a recipient to a distribution list, such as a distribution list defined by distribution list data 74 (FIG. 4) stored according to the data structure 100 (FIG. 5).

In this example, a message 140 is initially sent to two recipient electronic devices 14, 16, identified as "B" and "C". FIG. 8 and the related description can be referenced for greater detail regarding the message 140.

Upon reviewing the message 140, a user of one of the electronic devices 14, 16, indicated at "C" in this example, may decide to recommend that another user, designated "A", be added to the distribution list. The electronic device 16 may therefore be configured to issue an addition command 190 in the form of the addition command data structure 120 (FIG. 6), without the specific address of the user requesting the addition having to be authorized to update the distribution list. Accordingly, the client messaging program 50 of the requesting electronic device 14, 16 (e.g., device "C") provides the data required by the addition command data structure 130 (e.g., distribution list identifier 122, recipient address 126, and requesting address 128) and sends the addition command 190 to the server 20, 22 for processing.

The server 20, 22 receives the addition command 190 and processes the addition command 190 by confirming that the addition command is directed to adding another user. This can be accomplished by the server 20, 22 determining that the recipient address 126 is different from requesting address 128, so as to prevent a user from adding themselves. If the addition command 190 is indicative of a recipient requesting to add another user to the distribution list, then the server 20, 22 adds a new distribution list recipient 106 (FIG. 5) corresponding to the recipient address 126 identified by the addition command 190. Prior to adding the new recipient, the server 20, 22 can also confirm that the recipient is not already on the distribution list to prevent multiple instances of the same recipient from existing on the distribution list.

The server 20, 22 then responds to the requesting electronic device 14, 16 with an acknowledgement 192 of the addition command 190. The server 20, 22 may further be configured to only add new recipients to a distribution list conditional upon receiving approval from the authorized address (i.e., the address listed as a distribution list owner 104 in FIG. 5). Accordingly, the server 20, 22 may further send an addition request 194 to the authorized address, upon determining that the requesting address 128 is not a distribution list owner 104.

Table 2 summarizes the above logic.

TABLE 2

| Requesting address different from recipient address to be added? | Requesting address is authorized? | Action to take for recipient address to be added |
|---|---|---|
| TRUE | FALSE | ADD (CONDITIONAL) |
| FALSE | TRUE | IGNORE |
| TRUE | TRUE | ADD |
| FALSE | FALSE | IGNORE |

Note that in Table 2, the "ignore" result may suggest an error or an attempt at spoofing an addition command, and further action can be taken, such as sending a message to a network administrator.

Upon receiving the addition request 194, the distribution list owner's electronic device 14, 16 issues a user prompt 196 to approve or deny the request to add another user to the distribution list. The prompt 196 may take the form of a message, such as an email message containing hyperlinks, buttons, or similar user interface element configured to receive input of approval or denial.

Upon receiving input at the prompt 196, the distribution list owner's electronic device 14, 16 sends an addition response 198 to the server 20, 22, which is configured to add the new recipient to the distribution list, at 200, when the request 194 is approved, or do nothing when the request 194 is denied.

The server 20, 22 can further be configured to send at least the most recent message 140 to the newly added recipient at the associated electronic device 14, 16, indicated at "C". To do this, the server 20, 22 can reference the recipient address 126 in the addition command 190 and generate and send relevant messages 140 to the recipient address 126 upon receiving an addition response 198 approving the addition request 194. Relevant messages can be those messages with the same subject field text and addressed to the distribution list. Relevant messages can further be limited by a time constraint, such as messages sent to the distribution list within a predetermined time window prior to the addition of the new recipient. This can advantageously allow a newly added user to catch up on past messages, while optionally preventing an unnecessarily large number of messages from being sent and needlessly consuming network resources.

The electronic devices 14, 16 may further be configured to selectably include a removal command 142 (FIG. 8) to accompany the addition command 190, so that the user proposing the new recipient may also remove themselves from the distribution list at the same time. This can allow for greater efficiency of network resources by simultaneously or nearly simultaneously replacing one recipient of the distribution list with another, more suitable recipient.

At a later time, upon receiving an outbound message from one of the electronic devices 14, 16 sent as a reply to the message 140 or as a new message addressed to the distribution list, the server 20, 22 resolves the identifier of the distribution list in the message to the current recipient addresses. The server 20, 22 then sends the message to the current recipient addresses, which in this example notably now includes the added electronic device 14, 16 at "A" and may no longer include the requesting electronic device 14, 16 at "C".

Figures 11A, 11B, 11C:
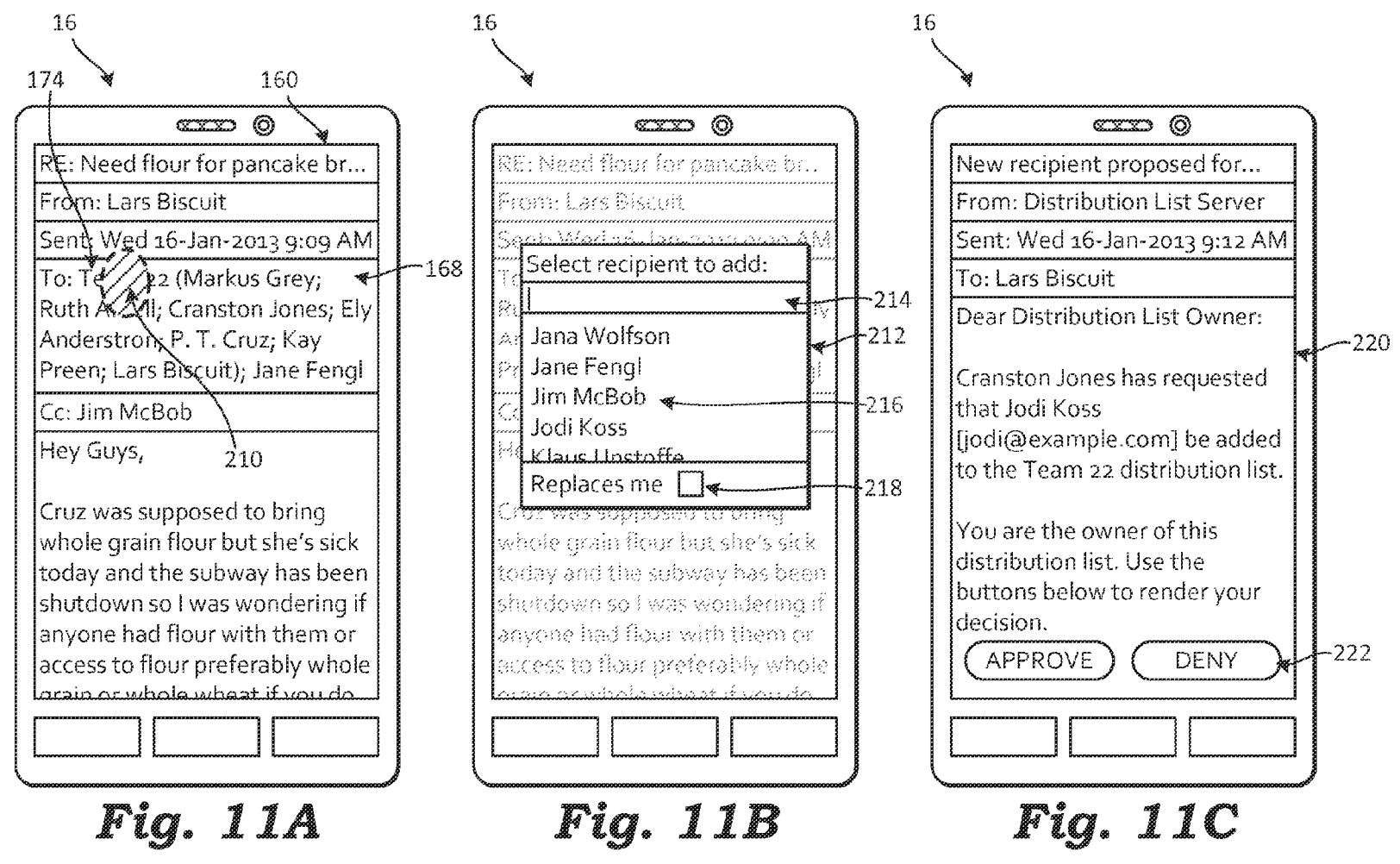

FIGS. 11A-C show user interfaces of different mobile electronic devices 16 for adding and approving a new recipient for a distribution list. FIGS. 11A-B show the requesting device 16, designated as "C" in FIG. 10, while FIG. 11C shows the approving device 16, designated as "B" in FIG. 10. However, it should be understood that each of the devices 16 can be configured with all of the functionality described with reference to FIGS. 11A-C to carry out action in response to input as described below.

To facilitate a current recipient adding a new recipient to a distribution list, the electronic device 16 is configured to receive a third predetermined input 210 at the distribution list indication 174 in the recipient field 168 of the message viewing interface 160. The third predetermined input 210 can include a touch, mouse click, key press, or the like, and further can, if required, be differentiated from the first predetermined input 176 (FIG. 9B) that expands the distribution list indication 174 by one or more of a hold time (i.e., touch-and-hold), number of touches or mouse clicks (e.g., a double-click), a different key being pressed, or similar.

The electronic device 16 is further configured to allow selection of the new recipient's address by way of a fourth predetermined input. This can be achieved by way of an address selection user interface element 212 that the electronic device 16 displays in response to the third predetermined input 210.

The address selection user interface element 212 can include a text input field 214 for receiving textual input of the new user's name or messaging address, a listing 216 of recipient names or addresses from which to select, a combination of such, or other similar selection interface. Input at the text input field 214 and listing 216 as well as population of the listing 216 with names or addresses can be achieved by the electronic device 16 querying a local or remote contacts database.

The address selection user interface element 212 may further include a replacement option element 218, such as a checkbox or the like, that is configured to receive an indication that the user of the device 16 wishes the new recipient to replace themselves on the distribution list. Affirmative selection at the replacement option element 218 triggers a removal command 142 (FIG. 8) in addition to the addition command 190 (FIG. 10) triggered by the selection of a new recipient via the text field 214 or listing 216.

The third predetermined input 210 at the distribution list indication 174 and the fourth predetermined input at the address selection user interface element 212 together form an addition input that indicates a new address to add to the distribution list. In response to the addition input, the electronic device 16 sends the addition command 190 (FIG. 10) to the server 20, 22, as discussed above.

FIG. 11C shows an example of the addition request 194 of FIG. 10 displayed on the electronic device 16 at which an address that is authorized to update the distribution list has been configured. The addition request 194 can include a message 220 indicating the substance of the request, such as the display name and messaging address of the user requested to be added to the distribution list. Including the messaging address of the proposed new recipient can, among other things, allow the owner of the distribution list to evaluate whether the proposed recipient's address is at a domain that is acceptable. That is, the message 220 can help prevent adding users outside of an organization to an organization's private distribution list. The addition request 194 can further include selection elements 222, such as hyperlinks or buttons, to approve or deny the request. User input at the selection elements 222 triggers the electronic device 16 to send an appropriate response 198 (FIG. 10) to the server 20, 22 to add or deny adding the new recipient to the distribution list.

It should be apparent from the above that a first user can quickly and easily add another user to a server-stored distribution list, even when the first user is not authorized to update the distribution list. That is, the first user is provided with the limited privilege to modify the distribution list by virtue of their address being on the distribution list, where the limited privilege is restricted to adding a new address to the distribution list. This can advantageously save network resources in that subsequent messages to the distribution list, such as replies, are sent to a new recipient who may be able to more efficiently handle the content of the message, thereby reducing the amount of subsequent messages sent to the distribution list. It is also advantageous that the first user can efficiently remove themselves from the distribution list at the same time as adding a new recipient. Further, adding new recipients may be configured as conditional on approval of the distribution list owner, so as to prevent confidential messages from being leaked.

Figure 12:
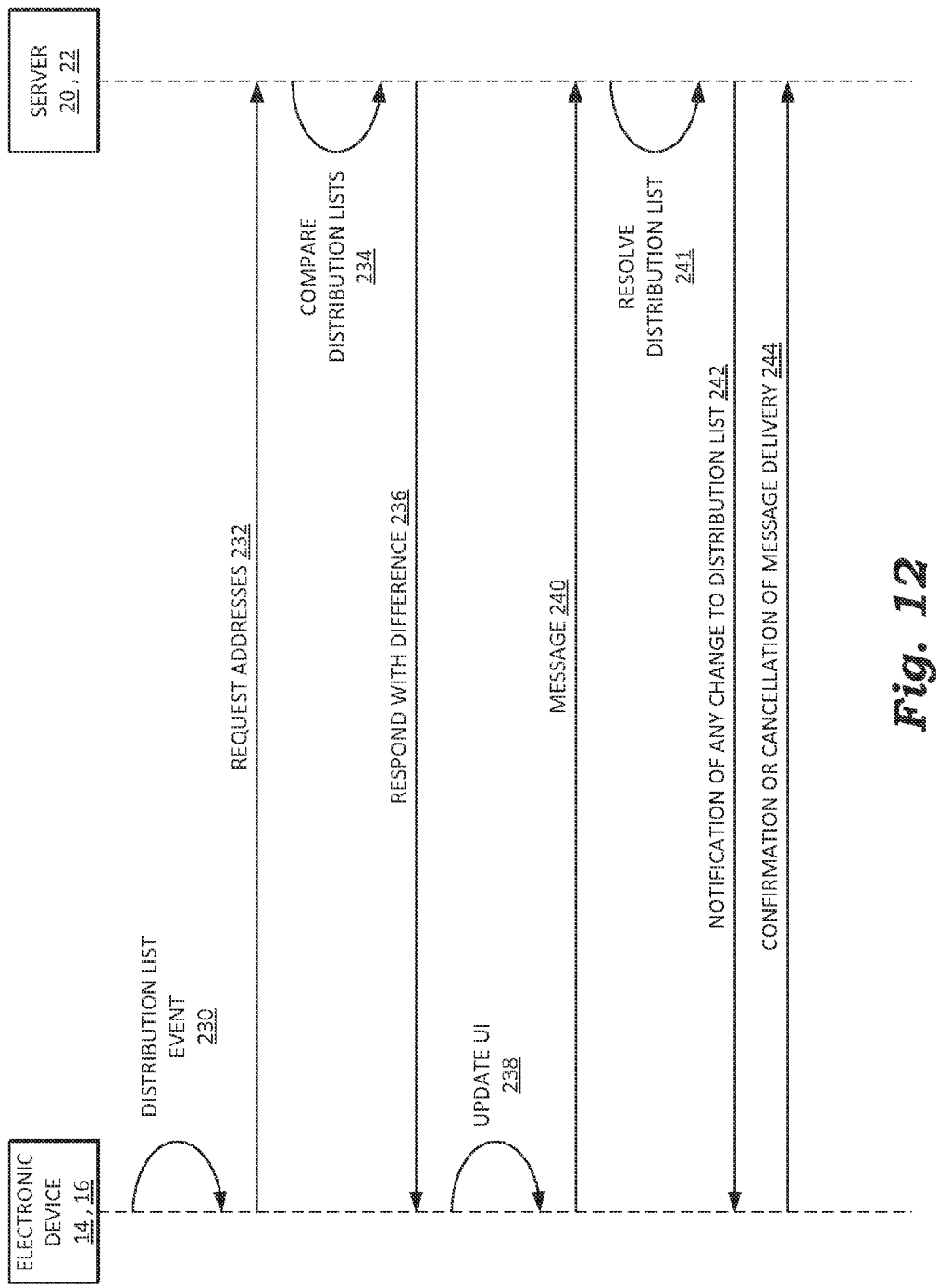
FIG. 12 is a diagram of a process for resolving a distribution list during message composition and sending.

FIG. 12 illustrates an example of a process for resolving a distribution list, such as a distribution list defined by distribution list data 74 (FIG. 4) stored according to the data structure 100 (FIG. 5), during message composition.

While a message is being composed at the electronic device 14, 16, a distribution list event 230 may occur. Examples of distribution list events 230 include adding a distribution list as a recipient to a message being composed or loading a previously saved draft message addressed to a distribution list. During message composition, a timer may be used to periodically trigger refreshing of a distribution list to which the message is addressed, and this can be considered a distribution list event 230 as well. The timer can be set to elapse after a predetermined duration that is selected to reduce unnecessary queries to the server copy of the distribution list, while still providing a reasonable representation of the current recipients of the distribution list to a user composing a message.

In response to a distribution list event 230, the electronic device 14, 16 sends a request 232 to the server 20, 22 for any updates to the distribution list, so as to keep the user of the electronic device 14, 16 informed as to the potential recipients of the message being composed. The request 232 can include an identifier 102 (FIG. 5) of the distribution list, and may further include an indication as to the recipients of the distribution list known to the electronic device 14, 16, such as a hash of a copy of the distribution list stored on the electronic device 14, 16, or a copy of the entire distribution list itself.

In response to receiving the update request 232, the server 20, 22 compares, at 234, its copy of the distribution list to the copy of the distribution list indicated by the request 232. When the request 232 includes a hash of the distribution list, the server 20, 22 takes a hash of the server copy of the distribution list and compares it with the hash in the request 232. A hash mismatch indicates that the server 20, 22 has a more up-to-date copy of the distribution list. When the request 232 includes a copy of the distribution list itself, the server 20, 22 may compare its copy of the distribution list with the copy received in the request 232. When the request is a simple request, the server 20, 22 may be configured to track the time since the last request 232 and determining whether the server copy of the distribution list has been changed during that time. Other techniques are also possible. The result is that the server 20, 22 determines whether a change has been made to the distribution list since the last time the server 20, 22 sent the distribution list or an update thereto to the remote electronic device 14, 16.

In response to determining that there has been a change to the distribution list, the server 20, 22 sends a response 236 to the remote device 14, 16. The response 236 can include an indication of addresses removed from or added to the distribution list. The response 236 can be according to the data structures shown in FIGS. 6 and 7 to indicate only the differences between the resolved plurality of recipient addresses and a previously resolved plurality of recipient addresses previously sent to the remote electronic device 14, 16. Alternatively, the response 236 can include the entire resolved distribution list of recipient addresses. If the server 20, 22 determines that there have been no updates to the distribution list, then the response 236 may merely indicate such or the server 20, 22 may refrain from sending the response 236.

Upon receiving the response 236, the device 14, 16 can update its user interface, at 238, to indicate to the user composing the message that the recipients of the distribution list have changed.

After message composition is complete, the electronic device 14, 16 sends the outgoing message 240 to the server 20, 22. The outgoing message includes the identifier 102 (FIG. 5) of the distribution list, and may further include an indication as to the recipients of the distribution list known to the electronic device 14, 16 at the time of sending the message. As such, the outgoing message may include information similar to that sent at 232.

In response to receiving the outgoing message, the server 20, 22 resolves the distribution list, at 241, to the plurality of recipient addresses to facilitate sending the message 240 to the most current set of recipients. The server 20, 22 further determines whether any updates have been made to the distribution list since the message 240 was sent, as discussed above with respect to the comparison at 234.

When determining that the recipients of the distribution list have changed since the message 240 was sent, the server 20, 22 can send a notification 242 of such to the electronic device 14, 16. Further, the server 20, 22 can also hold delivery of the message 240 until receiving a confirmation or cancellation command 244 from the electronic device 14, 16.

In response to receiving a command 244 from the electronic device 14, 16 indicating that the message 240 should be sent despite the recent change to the distribution list, the server 20, 22 delivers the message 240 to the recipients indicated by resolution of the distribution list. In response to receiving a command 244 from the electronic device indicating that the message 240 should not be sent because of the recent change to the distribution list, the server 20, 22 cancels delivery of the message 240.

It should be noted that server actions 234-244 also capture normal updates to the distribution list made from an authorized address listed as a distribution list owner 104 (FIG. 5). Accordingly, the user composing the message at the device 14, 16 is also informed of normal changes to the distribution list in addition to the new address additions or self-removals discussed above.

FIGS. 13A-C show user interfaces of a mobile electronic device 16 showing indications of updates to a distribution list during message composition and sending. A message composition interface 260 includes subject field 262, a recipient field 264, and a message content area 266 to display entered text or data of a message, such as the message 240 (FIG. 12), being composed at the mobile electronic device 16. The message composition interface 260 further includes input elements 268, such as buttons, that trigger sending, saving, and cancelling of the message under composition.

The recipient field 264 is configured to receive entry of one or more recipients, such as an indication 270 of a distribution list. Additional recipient fields, such as a copy address field and a blind-copy address field may also be provided.

During message composition, when the electronic device 16 receives a response 236 (FIG. 12) indicative of an update to the recipients of a distribution list in the recipient field 264, the electronic device 16 can display an indication 272 of such update as text or graphic adjacent to the distribution list indication 270. The adjacency of the update indication 272 to the distribution list indication 270 is sufficient to inform the user of the device 16 that the update indication 272 is relevant to the distribution list and not to another address that may be listed in the recipient field 264. The update indication 272 can be specific to the update in recipients, as shown, or may be a general indication that the distribution list has changed. This can advantageously allow the user to take action, such as canceling the message, which can save network resources, or altering message content, which can result in the message providing more efficient communication.

After the message has been sent from the electronic device 16, when the electronic device 16 receives a notification 242 (FIG. 12) that the distribution list had been updated, the electronic device 16 can display a confirmation interface 274 than can be configured to notify the user of the specific change to the distribution list and receive input confirming or cancelling delivery of the message. Input at the confirmation interface 274 causes the electronic device 16 to send an appropriate command 244 to the server 20, 22. During this interaction, an indication 276 that the message is pending delivery can be displayed at the electronic device 16, to further clarify to the user the message is being held by the server 20, 22 pending user input at the confirmation interface 274.

It should be apparent from the above that a user of the mobile electronic device can be quickly and readily informed of changes to a distribution list relevant to a message being composed by the user. Performing distribution list updates during message composition may demand less network resources than sending messages to an overly populated distribution list. Network resources can be saved by preventing the sending of unnecessary messages, such as a message directed to a recipient recently removed from the distribution list or a message suggesting that a recently added recipient be added.

According to one aspect of the present disclosure, a computer system can include at least one server connected to a network. The server can be configured to store a distribution list that identifies a plurality of recipient addresses for electronic messages, and update the distribution list when receiving update commands via the network from an authorized address that is stored in association with the distribution list as authorized to update the distribution list. The server can be further configured to remove from the distribution list a specific address of the plurality of recipient addresses when receiving a removal command from the specific address. The specific address is unauthorized to update the distribution list. The server can be further configured to resolve the plurality of recipient addresses from an identifier of the distribution list contained in an outbound electronic message upon receiving the outbound electronic message via the network, and send the outbound electronic message to the resolved plurality of recipient addresses.

The server can further be configured to, upon receiving a request via the network from a remote electronic device, compare the distribution list to an indication of the distribution list on the remote electronic device at which an electronic message in composition is addressed to the distribution list, and send an indication of the comparison to the remote electronic device.

The indication of the comparison can include an indication of an added or removed recipient address.

The server can further be configured to delete the distribution list after an expiry time.

The server can further be configured to add to the distribution list a new address not among the plurality of recipient addresses when receiving an addition command from an address of the plurality of recipient addresses that is unauthorized to update the distribution list.

The server can further be configured to add the new address to the distribution list as conditional on receiving approval from the authorized address.

The server can further be configured to send a most recent message addressed to the distribution list to the new address after the new address is added to the plurality of recipient addresses of the distribution list.

According to another aspect of the present disclosure, an electronic device can include an input interface, a display, a communications interface, and a processor coupled to the input interface, the display, and the communications interface. The processor can be configured to store a user address associated with an electronic messaging account accessible at the electronic device, and generate at the display a message viewing interface configured to display electronic messages received via the communications interface. The message viewing interface can include a recipient field configured to display an indication of a distribution list. The processor can further be configured to provide to the communications interface a removal command in response to a removal input received at the indication of the distribution list. The removal command can be configured to be sent by the communications interface to a computer system that maintains the distribution list to remove the user address from the distribution list.

The processor can further be configured to expand the indication of a distribution list to generate at the display indications of a plurality of recipient addresses of the distribution list, the plurality of addresses including the user address and the indication of the user address being responsive to the removal input.

The processor can further be configured to generate at the display a message composition interface configured to receive via the input interface a message and an indication of a distribution list to which the message is addressed, and to display an indication of an update to the distribution list when receiving the update of the distribution list from the communications interface.

The indication of the update to the distribution list can be adjacent to the indication of the distribution list.

The processor can further be configured to provide to the communications interface an addition command in response to an addition input received at the indication of the distribution list, the addition input indicating a new address. The addition command can be configured to be sent by the communications interface to the computer system that maintains the distribution list to add the new address to the distribution list.

According to another aspect of the present disclosure, a method can include storing a distribution list that identifies a plurality of recipient addresses for electronic messages, updating the distribution list when receiving update commands via the network from an authorized address that is stored in association with the distribution list as authorized to update the distribution list, and removing from the distribution list a specific address of the plurality of recipient addresses when receiving a removal command from the specific address. The specific address is unauthorized to update the distribution list. The method can further include resolving the plurality of recipient addresses from an identifier of the distribution list contained in an outbound electronic message upon receiving the outbound electronic message via the network, and sending the outbound electronic message to the resolved plurality of recipient addresses.

The method can further include, upon receiving a request via the network from a remote electronic device, comparing the distribution list to an indication of the distribution list on the remote electronic device at which an electronic message in composition is addressed to the distribution list, and sending an indication of the comparison to the remote electronic device.

The indication of the comparison can include an indication of an added or removed recipient address.

The method can further include deleting the distribution list after an expiry time.

The method can further include adding to the distribution list a new address not among the plurality of recipient addresses when receiving an addition command from an address of the plurality of recipient addresses that is unauthorized to update the distribution list.

Adding the new address to the distribution list can be conditional on receiving approval from the authorized address.

The method can further include sending a most recent message addressed to the distribution list to the new address after the new address is added to the plurality of recipient addresses of the distribution list.

The storing, updating, removing, resolving, and sending of the method can be performed by at least one server that receives the removal command from a remote electronic device via a network.

While the foregoing provides certain non-limiting example embodiments, it should be understood that combinations, subsets, and variations of the foregoing are contemplated. The monopoly sought is defined by the claims.

What is claimed is:

1. A server connected to a network, the server comprising:
a processor, a communications interface configured to connect with the network, and a memory storage unit configured to store a dynamic distribution list that identifies a plurality of recipient addresses for a plurality of electronic messages, the dynamic distribution list including an administrator address authorized to update the dynamic distribution list, the administrator associated with an owner of the distribution list, others of the plurality of recipient addresses not authorized to update the dynamic distribution list, the processor configured to:
in response to a previous transmission of a first electronic message to the plurality of recipient addresses:
receive, using the communications interface a removal command from a given recipient address of the plurality of recipient addresses of the dynamic distribution list, the removal command including a recipient address to be removed from the dynamic distribution list;

prevent, at the processor, removal of the administrator address by: when the given recipient address from which the removal command was received is the same as the recipient address in the removal command, and when the given recipient address is both: one of the others of the plurality of recipient addresses not authorized to update the dynamic distribution list; and not the administrator address, then: generate an amended dynamic distribution list from the dynamic distribution list by removing the recipient address in the removal command from the dynamic distribution list stored at the memory storage unit;

when the given recipient address is the administrator address, generate the amended dynamic distribution list by removing the recipient address, only when the recipient address in the removal command is not the same as the administrator address; and, after the amended dynamic distribution list is generated, distribute any further electronic messages received in response to the first electronic message to the plurality of recipient addresses of the amended dynamic distribution list.

2. The server of claim 1, wherein the processor is further configured to:

in response to receiving a request for updates to the dynamic distribution list, using the communications interface, from another recipient address of the amended dynamic distribution list, the request including an identifier of contents of a distribution list stored at an electronic device associated with the another recipient address, compare the amended distribution list to the identifier; and, send an indication of comparing the amended distribution list to the indication to the electronic device.

3. The server of claim 2, wherein the indication of the comparing comprises one or more of: the amended distribution list; an added recipient address; and a removed recipient address.

4. The server of claim 1, wherein the memory storage unit is further configured to delete the dynamic distribution list after an expiry time.

5. The server of claim 1, wherein the processor is further configured to:

in response to the previous transmission of the first electronic message to the plurality of recipient addresses, receive, using the communications interface an addition command from another recipient address of the plurality of recipient addresses, the addition command including a new recipient address that is not among the plurality of recipient addresses of the amended dynamic distribution list; and, update the amended dynamic distribution list by adding the new recipient address to the amended distribution list stored at the memory storage unit.

6. The server of claim 5, wherein the processor is configured to add the new recipient address to the amended distribution list after receiving approval from the administrator address.

7. The server of claim 5, wherein the processor is further configured to send a most recent message addressed to the dynamic distribution list to the new recipient address after the new recipient address is added to the plurality of recipient addresses of the amended distribution list.

8. A method comprising:

at a server comprising: a processor, a communications interface configured to connect with a network, and a memory storage unit configured to store a dynamic distribution list that identifies a plurality of recipient addresses for a plurality of electronic messages, the dynamic distribution list including an administrator address authorized to update the dynamic distribution list, the administrator address associated with an owner of the distribution list, others of the plurality of recipient addresses not authorized to update the dynamic distribution list, in response to a previous transmission of a first electronic message to the plurality of recipient addresses:

receive, using the communications interface a removal command from a given recipient address of the plurality of recipient addresses of the dynamic distribution list, the removal command including a recipient address to be removed from the dynamic distribution list;

preventing, at the processor, removal of the administrator address by: when the given recipient address from which the removal command was received is the same as the recipient address in the removal command, and when the given recipient address is both: one of the others of the plurality of recipient addresses not authorized to update the dynamic distribution list; and not the administrator address, then: generating an amended dynamic distribution list from the dynamic distribution list by removing the recipient address in the removal command from the dynamic distribution list stored at the memory storage unit when the given recipient address is the administrator address, generate the amended dynamic distribution list by removing the recipient address therefrom, only when the recipient address in the removal command is not the same as the administrator address; and, after the amended dynamic distribution list is generated, distributing any further electronic messages received in response to the first electronic message to the plurality of recipient addresses of the amended dynamic distribution list.

9. The method of claim 8, further comprising:

in response to receiving a request for updates to the dynamic distribution list, using the communications interface, from another recipient address of the amended dynamic distribution list, the request including an identifier of contents of a distribution list stored at an electronic device associated with the another recipient address, comparing the amended distribution list to the identifier; and, sending an indication of the comparing of the amended distribution list to the indication to the electronic device.

10. The method of claim 9, wherein the indication of the comparing comprises one or more of: the amended distribution list; an added recipient address; and a removed recipient address.

11. The method of claim 8, further comprising deleting the dynamic distribution list after an expiry time.

12. The method of claim 8, further comprising: in response to the previous transmission of the first electronic message to the plurality of recipient addresses, receive, using an addition command from another recipient address of the plurality of recipient addresses, the addition command including a new recipient address that is not among the plurality of recipient addresses of the amended dynamic distribution list; and,
update the amended dynamic distribution list by adding the new recipient address to the amended distribution list stored at the memory storage unit.

13. The method of claim 12, wherein adding the new recipient address to the amended distribution list occurs after receiving approval from the administrator address.

14. The method of claim 12, further comprising sending a most recent message addressed to the dynamic distribution list to the new recipient address after the new recipient address is added to the plurality of recipient addresses of the amended distribution list.

15. A non-transitory computer-readable medium storing a computer program wherein execution of the computer program is for:
at a server comprising: a processor, a communications interface configured to connect with a network, and a memory storage unit configured to store a dynamic distribution list that identifies a plurality of recipient addresses for a plurality of electronic messages, the dynamic distribution list including an administrator address authorized to update the dynamic distribution list, the administrator address associated with an owner of the distribution list, others of the plurality of recipient addresses not authorized to update the dynamic distribution list,
in response to a previous transmission of a first electronic message to the plurality of recipient addresses:
receive, using the communications interface a removal command from a given recipient address of the plurality of recipient addresses of the dynamic distribution list, the removal command including a recipient address to be removed from the dynamic distribution list;
preventing, at the processor, removal of the administrator address by:
when the given recipient address from which the removal command was received is the same as the recipient address in the removal command, and when the given recipient address is both: one of the others of the plurality of recipient addresses not authorized to update the dynamic distribution list; and not the administrator address, then: generating an amended dynamic distribution list from the dynamic distribution list by removing the recipient address in the removal command from the dynamic distribution list stored at the memory storage unit;
when the given recipient address is the administrator address, generate the amended dynamic distribution list by removing the recipient address therefrom, only when the recipient address in the removal command is not the same as the administrator address; and,
after the amended dynamic distribution list is generated, distributing any further electronic messages received in response to the first electronic message to the plurality of recipient addresses of the amended dynamic distribution list.

16. The non-transitory computer-readable medium of claim 15, further comprising:
in response to receiving a request for updates to the dynamic distribution list, using the communications interface, from another recipient address of the amended dynamic distribution list, the request including an identifier of contents of a distribution list stored at an electronic device associated with the another recipient address, comparing the amended distribution list to the identifier; and,
sending an indication of the comparing of the amended distribution list to the indication to the electronic device.

17. The non-transitory computer-readable medium of claim 16, wherein the indication of the comparing comprises one or more of: the amended distribution list; an added recipient address; and a removed recipient address.

18. The non-transitory computer-readable medium of claim 15, further comprising deleting the dynamic distribution list after an expiry time.

19. The non-transitory computer-readable medium of claim 15, further comprising:
in response to the previous transmission of the first electronic message to the plurality of recipient addresses, receive, using an addition command from another recipient address of the plurality of recipient addresses, the addition command including a new recipient address that is not among the plurality of recipient addresses of the amended dynamic distribution list; and,
update the amended dynamic distribution list by adding the new recipient address to the amended distribution list stored at the memory storage unit.

* * * * *